United States Patent Office 3,719,284
Patented Mar. 6, 1973

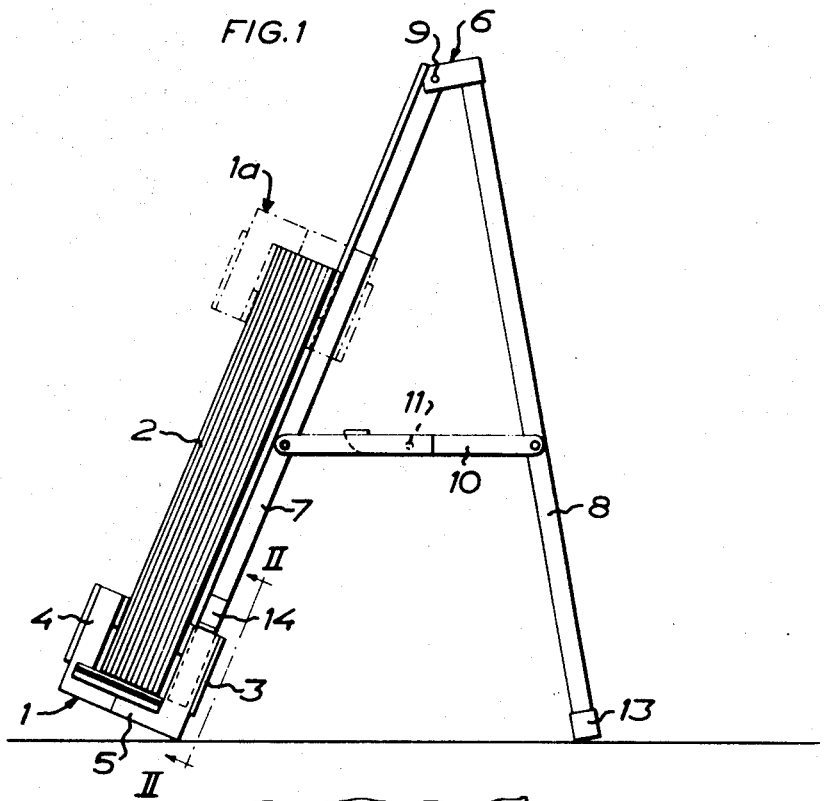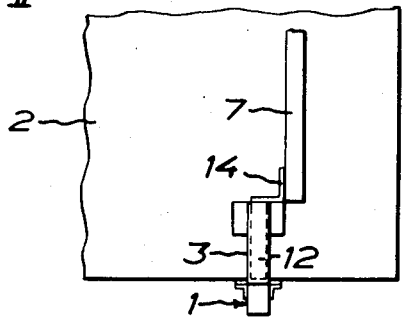

3,719,284
EQUIPMENT FOR HANDLING GLASS SHEETS AND THE LIKE
Stig Arne Rasmus Rasmusson, Leif Key, Tommy Dahlstrom, and Ernst Georg Thelander, Emmaboda, Sweden, assignors to AB Emmaboda Glasverk, Emmaboda, Sweden
Filed Apr. 7, 1971, Ser. No. 132,044
Claims priority, application Sweden, Apr. 8, 1970, 4,759/70
Int. Cl. A47f 7/00; B65h 1/02
U.S. Cl. 211—50                           2 Claims

ABSTRACT OF THE DISCLOSURE

Equipment for handling glass sheets, consisting of U-shaped clamps for clamping a pack of sheets for shipping and A-shaped frames, one leg of which is inserted into a clamp jaw to form an easel-like support for the pack, thereby facilitating unpacking the sheets.

---

This invention relates to the handling of glass sheets and the like, especially the transport and unpacking of packaged sheet glass.

There has recently been introduced a packaging method according to which a pack of rectangular glass sheets are clamped to form a compact package by means of specially designed screw clamps, usually four such clamps which are placed in pairs opposite one another at opposite edges of the pack. The special form of the clamps provides for a package of a shape suitable for stowing, without any projecting portions that could be in the way or become damaged, simultaneously as the consumption of packaging material is considerably reduced. The receiver of such a package will thus not be bothered with any wooden crates and a lot of wood wool, paper or the like, and the clamps can be returned to the supplier for renewed use.

However, it is desired to make also the unpacking easier for the receiver, and this is the object of the present invention which provides a support against which the glass package can be inclined, standing on edge, and from which the glass sheets can be conveniently taken out after the clamps have been loosened and partially removed. Characteristic of the implement according to the present invention is that it comprises a clamp, at least one gripping paw of which consists of a tube open at its free end, and of a two-legged frame, one leg of which is adapted to be pushed into said one gripping jaw and to form an extension thereof.

The invention will now be described in more detail in the following, reference being had to the accompanying drawing which illustrates an embodiment chosen by way of example. In the drawing:

FIG. 1 is a side view of a complete support with a sheet glass package mounted thereon;

FIG. 2 is a projection on line II—II of FIG. 1;

Figure 3:
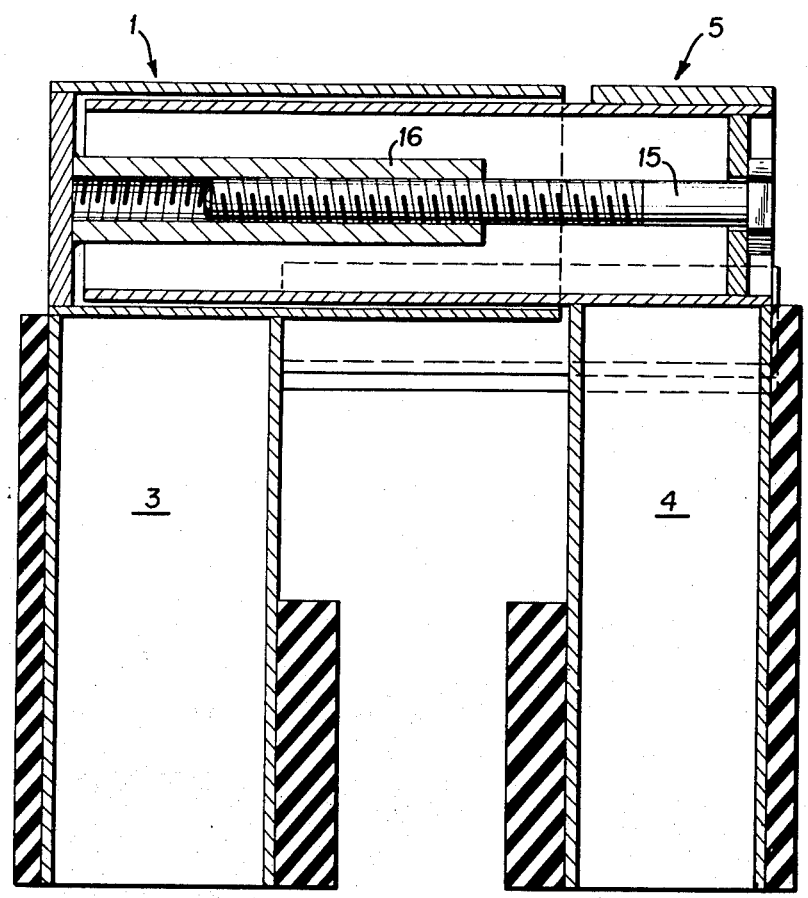
FIG. 3 is a cross-sectional view of a clamp employed with the support of FIG. 1.

In the drawing, 1 designates a clamp which together with a further number of identical clamps, one of which is indicated at 1a, is used for holding the glass package 2 together during transport.

The clamp comprises two L-shaped elements made of square tubes and forming each one gripping jaw 3 and 4, respectively, and constituting in combination a telescopic back member 5, as well as a clamping screw 15, 16 which is entirely enclosed in said back member 5. A detailed description of the clamp construction is given in U.S. patent application Ser. No. 84,723, filed Oct. 28, 1970 (corresponding to Swedish patent application 14,776/69).

In the drawing, the glass package 2 is shown placed on edge and inclined against a frame 6, with the clamp 1 still in position. The frame comprises front and rear legs 7 and 8, respectively, interconnected at the top by a pivot pin 9, and a link 10 interconnecting the legs, said link 10 having an elbow joint 11 in its center so that the frame can be folded together and thus will require less space when not in use.

The front leg 7 terminates at its lower end in a pin 12 inserted in the gripping jaw 3 of the clamp 1, and the leg 7 forms together with the gripping jaw 3 and the outer part, connected therewith, of the back member 5 of the clamp a support carrying and supporting the glass package 2, from which support the glass sheets can be conveniently removed one by one after the gripping jaw 4 and its associated part of the back member 5 have been unscrewed and removed.

The rear leg 8 terminates at its lower end in a foot 13 which provides for sufficient stability so that the support can stand by itself.

In the embodiment illustrated, the pin 12 is connected with the leg 7 by means of an angle iron 14 and laterally offset in parallel relation so that the leg 7 will go free of the clamp 1a when the glass package is placed against the frame with all clamps still in position. The clamp 1a is preferably placed on a line with the clamp 1 in order to facilitate stowing of several packages on a transport vehicle or in a storage space.

Naturally, two frames are usually employed for each glass package, in combination with one clamp on each frame on the lower edge thereof.

What we claim and desire to secure by Letters Patent is:

1. An implement for handling glass sheets and the like, comprising in combination a screw clamp having a clamping screw and two L-shaped telescopic elements forming a pair of jaws, one of said jaws being hollow and open at its free end, and a two-legged frame, one leg of said frame being adapted to be inserted into said hollow jaw to form an extension thereof.

2. An implement as claimed in claim 1, further comprising pivot means connecting the legs of said frame at their upper ends, a link connecting said legs between their ends, and an elbow joint in the center of said link, the frame thus being collapsible.

References Cited

UNITED STATES PATENTS

| 2,466,149 | 4/1949 | Burg | 211—50 X |
| 343,403 | 6/1886 | Smith | 248—453 |
| 667,763 | 2/1901 | Briner | 248—453 |
| 1,358,583 | 11/1920 | Sawyer | 248—465 |
| 1,850,647 | 3/1932 | Whitcomb | 211—41 U X |
| 3,098,314 | 7/1963 | Degorski | 248—453 |

FOREIGN PATENTS

| 9,220 | 6/1887 | Great Britain | 248—453 |
| 930,059 | 7/1963 | Great Britain | 211—41 |
| 123,660 | 3/1919 | Great Britain | 248—453 |

ROY D. FRAZIER, Primary Examiner
A. FRANKEL, Assistant Examiner

U.S. Cl. X.R.
211—41; 248—453, 465